UNITED STATES PATENT OFFICE 2,264,436

SULPHONIC ACID SALTS OF OXDIAZOLONES

Curt Engel, St. Louis, France, and Kurt Pfaehler, Riehen, near Basel, Switzerland, assignors to J. R. Geigy A. G., Basel, Switzerland No Drawing. Application April 9, 1940, Serial No. 328,797. In Switzerland April 26, 1939

3 Claims. (Cl. 260—307)

It has been found that heterocyclic compounds with higher molecular aliphatic or alicyclic substituents of the formula

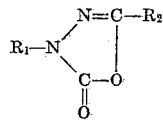

are obtained, wherein $R_1$ means an aromatic radical, which can also be substituted and $R_2$ means an aliphatic or alicyclic substituent with more than 5 C-atoms, if aromatic hydrazines acylated by aliphatic or alicyclic carboxylic acids with more than 6 C-atoms, are caused to react with phosgene, halogen carbonic acid esters or other suitable carbonic acid derivatives. There are obtained keto-derivatives of dihydro-1:3:4-oxdiazols (keto-oxdiazolines) of the formula

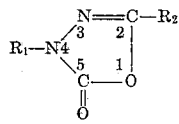

When water-solubilizing groups such as sulphonic acid groups are in the aromatic radical $R_1$, the final compounds are water-soluble. But this property can also be realized by after-sulphonating of the primarily water-insoluble or not sufficiently water-soluble compounds. Derivatives of the aforesaid compound class containing amino groups may also be converted into a water-soluble form by oxalkylation, exhaustive alkylation or aralkylation and so on. It is obvious that it is also possible to combine in certain cases sulphonation and alkylation (generally understood).

Under the definition given above for the alicyclic radical $R_2$ there should also be understood the radicals derived from aromates by hydrogenation.

Processes for the manufacture of the starting products may shortly be indicated in the following:

Generally, aromatic hydrazines, which may contain in the aromatic nucleus still other substituents, such as for example halogen, alkyl-, nitro-, sulphonic acid groups and so on, are acylated with a carboxylic acid or a suitable derivative thereof such as a halide, anhydride and so on, whereupon these aromatic hydrazides are cyclized with carbonic acid derivatives according to usual methods.

One starts from aromatic hydrazines and introduces thereinto an organic acid radical with more than 6 C-atoms. The choice of the carboxylic acid to be used for the acylation is determined by the manner according to which the position 2 of the hetero-ring (radical $R_2$ in the above formulae) shall be substituted after the ring-closure. Thus palm-nut-oil-fatty acid phenyl-hydrazide will be, by condensation with phosgene, cyclized to the 2-"undecyl"-4-phenyl-1:3:4-oxdiazolone(-5), "undecyl" meaning the mixture of radicals connected with the COOH-group in the palm-nut-fatty-acid, comprising mainly the compound $C_{11}H_{23}.COOH$, i. e. lauric acid.

Instead of the palm-nut-oil-fatty acid phenyl-hydrazide there may also be used the aromatic hydrazides of other fatty acids such as of the stearic, oleic, cod-fish-oil fatty acid, the soya-bean-oil fatty acid and so forth or of the naphthenic-, resin-, campholic-, fencholic-acid and so on or their suitable derivatives.

The water-soluble compounds according to the present invention possess remarkable capillar-active properties. The union of several different properties in one compound is especially valuable; thus products with the properties of a good softening agent, of a lime soap emulgator and lime soap solvent, of a wool-washing agent and of a wetting agent are obtained.

The invention is illustrated, but not limited, by the following examples, the parts being by weight, where nothing other is said.

Example 1

285 parts of palm-nut-oil fatty acid phenyl-hydrazide, made from phenylhydrazine and palm-nut-oil fatty acid chloride, are hot dissolved in 1500 parts by volume of dry benzene and, after cooling down to 10° C., phosgene is introduced thereinto in a slow current during 4 hours, whereby the hydrazide is again gradually dissolved. The whole is still heated for 2 hours on the water-bath while further introducing phosgene. After cooling down the reaction mass is mixed with water, the benzene solution is separated off and dried with sodium sulphate. Under a pressure of 0.5 mm. 280 parts of the oxdiazolone pass over at 130–275° C. as a bright yellowish oil.

By using in the above example, instead of the palm-nut-oil fatty acid-hydrazide, other hydrazides such as those resulting on the one hand from o-, m-, p-tolylhydrazines, the three isomer monochlorophenylhydrazines, the three isomer mononitrophenylhydrazines, the β-naphthylhydrazine, the p-diphenylhydrazine and so on and on the other hand from saturated and unsaturated fatty acids and their mixtures such as oleic-, stearic-, cod-fish-oil-, soya-bean-oil fatty acid and so on or their substitution products, one obtains according to the same reaction the corresponding dihydro-oxdiazols.

By using halogen carbonic acid esters, for example chlorocarbonic acid ester instead of phosgene, one obtains the same compounds.

The above mentioned water-insoluble compounds can be rendered water-soluble by sulphonation as follows:

25 parts of 2-"undecyl"-4-(p-tolyl)-1:3:4-oxdiazolone(-5) are gradually introduced under stirring at 10–20° C. into 25 parts of sulphuric acid monohydrate, the whole is cooled down to 0° C. and 25 parts of oleum of 26 per cent strength are slowly added thereto, whereupon 25 parts of oleum of 66 per cent strength are added thereto drop by drop. The mixture is stirred at 0–10° C., until a test is clearly soluble in water. Then the reaction mass is poured on ice and the mixture of mono- and disulphonic acids is neutralized by addition of caustic soda lye. By concentrating through evaporation the sodium salt is obtained as yellow-brown powder, which is soluble in water and whose solutions are strongly foaming.

The analogous o-tolyl or phenyl compounds have quite similar properties and are obtained by the same processes.

*Example 2*

42 parts of m-phenylhydrazine-sulphonic acid of 91.1 per cent strength are suspended in 250 parts by volume of pyridine, then 46 parts of palm-nut fatty acid chloride are dropped in at room temperature and the mixture is stirred, until a test is clearly soluble in hot water. After distilling off the pyridine in excess in vacuo the residue is stirred with 400 parts by volume of benzene and phosgene is introduced into the suspension up to saturation, whereupon phosgene is further introduced for a short time under heating on the water-bath. The benzene is then distilled off, the residue is absorbed in hot water, exactly neutralized with caustic soda lye and the aqueous solution is evaporated in vacuo to dryness. There results the sodium salt of the 2-undecyl-4-(m-sulphophenyl)-1:3:4-oxdiazolone(-5) as a white powder, which is clearly soluble in water and whose solutions are strongly foaming. By after-sulphonating of this mono-sulphonic acid one can, if desired, still obtain polysulphonic acids.

Instead of the above used m-phenylhydrazine-sulphonic acid the p- or o-compound can also be condensed with palm-nut fatty acid chloride, or the three isomer phenylhydrazine-sulphonic acids can be condensed with oleic or stearic acid. By using phenylhydrazine-2:5-disulphonic acid together with the above cited fatty acids one obtains compounds with similar properties.

*Example 3*

10 parts of 2-"undecyl"-4-(p-aminophenyl)-1:3:4-oxdiazolone(-5), made by reduction of 2-undecyl-4-(p-nitro-phenyl-1:3:4-oxdiazolone(-5), which in its turn is obtained according to Example 1 from palm-nut fatty acid-p-nitrophenylhydrazide and phosgene, are dissolved in 100 parts by volume of chlorobenzene and after addition of 9 parts of potassium carbonate and 8 parts of dimethylsulphate heated for 12 hours to 95–100° C. Then there is filtered and the dimethylamino compound obtained by distillation of the chlorobenzene.

10 parts of 2-"undecyl"-4-(p-dimethylaminophenyl)-1:3:4-oxdiazolone(-5) are heated for 1 hour on the water-bath with 10 parts of dimethylsulphate. There results a brown liquor which is clearly soluble in water and whose solutions are strongly foaming.

Instead of the p-nitrophenylhydrazide of the palm-nut fatty acid in the above example one may also use the corresponding o-nitrophenylhydrazide or the o- or p-nitrophenylhydrazide of the stearic acid or of another of the above mentioned fatty acids. For the alkylation one can also use other usual alkylating agents such as halogen-alkyls, such as chloromethyl, chlorethyl, diethylsulphate, toluene-sulphonic acid methyl or ethyl ester, ethylene oxide and so on. The manufacture of the quaternary compound can also be effected with other compounds than that used in the above example, thus for instance with benzylhalides, halogen-alkyls and so forth. If oxyalkyl groups are present, the solubility in water can also be realized in the usual manner by esterification with sulphuric acid and so on.

What we claim is:

1. The soluble salts of sulphonic acids of oxdiazolones of the general formula

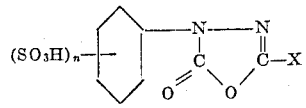

wherein $n$ means an integer of the group consisting of 1 and 2 and X means a radical selected from the group consisting of alkyl and cycloalkyl radicals containing more than 5 carbon atoms, usable as softeners, lime soap emulsifiers, wool-washing and wetting agents.

2. The sodium salt of sulphonic acids of oxdiazolones of the formula

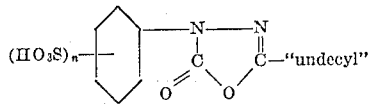

wherein $n$ means an integer of the group consisting of 1 and 2, usable as softeners, lime soap emulsifiers, wool-washing and wetting agents.

3. The sodium salt of sulphonic acids of oxdiazolones of the formula

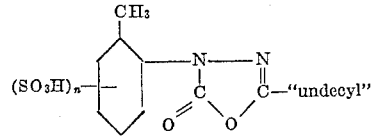

wherein $n$ means an integer of the group consisting of 1 and 2, usable as softeners, lime soap emulsifiers, wool-washing and wetting agents.

CURT ENGEL.
KURT PFAEHLER.